United States Patent [19]

Shimizu et al.

[11] Patent Number: 5,173,544
[45] Date of Patent: Dec. 22, 1992

[54] EPOXY RESIN COMPOSITIONS

[75] Inventors: Hisashi Shimizu, Annaka; Kazutoshi Tomiyoshi, Takasaki; Hatsuji Shiraishi; Toshio Shiobara, both of Annaka, all of Japan

[73] Assignee: Shin-Etsu Chemical Co., Ltd., Tokyo, Japan

[21] Appl. No.: 523,814

[22] Filed: May 16, 1990

[30] Foreign Application Priority Data

May 17, 1989 [JP] Japan .................. 1-121348

[51] Int. Cl.$^5$ ............ C08L 63/02; C08L 63/04
[52] U.S. Cl. .................... 525/476; 525/487; 525/524; 523/433; 523/435; 528/27
[58] Field of Search ........... 525/403, 476, 487, 524; 523/433, 435; 528/27

[56] References Cited

U.S. PATENT DOCUMENTS 4,877,822 10/1989 Itoh et al. ...................... 523/433

FOREIGN PATENT DOCUMENTS 218228 4/1987 European Pat. Off. .
21417 2/1983 Japan .

OTHER PUBLICATIONS

*Chemistry and technology of Silicones* by W. Noll, 1968, pp. 171, 172, 439–441, 579.
*Handbook of Epoxy Resins*, H. Lee et al., 1967, pp. 6-25 to 6-27.

*Primary Examiner*—Ralph H. Dean, Jr.
*Attorney, Agent, or Firm*—Finnegan, Henderson, Farabow, Garrett & Dunner

[57] ABSTRACT

An epoxy resin composition comprising an epoxy resin, a curing agent, and a copolymer mixture comprising a long-chain organopolysiloxane copolymer [I] and a short-chain organopolysiloxane copolymer [II] which are each prepared by the addition reaction of an alkenyl-containing epoxy resin with a long-chain or short-chain organopolysiloxane containing pendant phenyl groups at a weight ratio of [II] to [I] of 0.3 to 0.6 is disclosed. The epoxy resin composition exhibits excellent printability, crack resistance, and moldability properties.

10 Claims, No Drawings

EPOXY RESIN COMPOSITIONS

BACKGROUND OF THE INVENTION

The present invention relates to an epoxy resin composition. Particularly, it relates to an epoxy resin composition which is excellent in printability, and which has improved properties in crack resistance without detriment to the mechanical strengths such as flexural strength and flexural modulus, and exhibits a low expansion coefficient and a high glass transition point, thus being excellent in moldability including deformation resistance in molding.

An epoxy resin and a composition comprising said resin and an inorganic filler are generally so superior to other thermosetting resins in moldability, adhesion, electrical and mechanical properties, humidity resistance and the like that they have been widely used as, for example, various molding materials, powder coating materials or electrical insulating materials. Particularly, they have recently been noted as the sealing material of semiconductors.

However, many of conventional epoxy resin compositions cause crack in curing to give a molding or coating having a damaged appearance or a defective semiconductor element or device. In order to solve these problems, the inventors of the present invention previously proposed an epoxy resin composition excellent in crack resistance which comprises a curable epoxy resin and a block copolymer comprising an aromatic polymer and an organopolysiloxane (Japanese Patent Laid-Open No. 21417/1983). However, it is still expected to develop an epoxy resin composition which is further improved in crack resistance without detriment to the mechanical strengths such as flexural strength and flexural modulus and exhibits a low expansion coefficient and a high glass transition point, thus being excellent in moldability including deformation resistance in molding.

Further, the above epoxy resin composition containing a block copolymer comprising an aromatic polymer and an organopolysiloxane was problematic in that the surface of a molded article thereof was too poor in printability to print thereon in a making ink.

SUMMARY OF THE INVENTION

It is therefore the object of the present invention is to provide an epoxy resin composition which exhibits a low expansion coefficient and a high glass transition point and is improved in crack resistance without detriment to the mechanical strengths represented by flexural strength and flexural modulus and which can give a molded article having an excellent printable surface.

In order to attain the above object, the inventors of the present invention have intensively studied to obtain a modifier for an epoxy resin which is effective in improving the printability and crack resistance of an epoxy resin composition comprising a curable epoxy resin, a curing agent, and have found that an organopolysiloxane copolymer mixture containing pendant phenyl groups which comprises a copolymer [I] (hereinafter referred to as "a long-chain organopolysiloxane copolymer (I)") prepared by the addition reaction of an alkenyl-containing epoxy resin with a long-chain organopolysiloxane represented by the following formula (1):

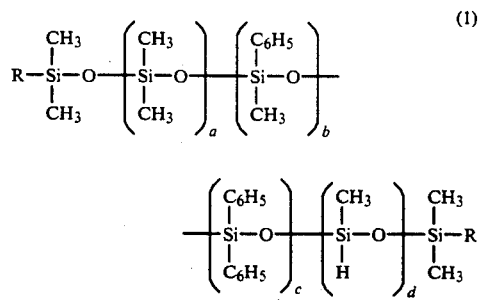

(wherein R is a hydrogen atom or a methyl group, a, b, c, and d are integers satisfying the relationships: $a \geq 1$, $b \geq 0$, $c \geq 0$, $d \geq 0$, and $b+c \geq 1$, the amount of the phenyl group is 4 to 15 mole % based on the total amount of the methyl and phenyl groups, and the number of hydrogen atoms directly bonded to silicon atoms per molecule at least 2) and containing 70 to 300 silicon atoms per molecule, and a copolymer [II] (hereinafter referred to as "a short-chain organopolysiloxane copolymer (II)") prepared by the addition reaction of an alkenyl-containing epoxy resin with a short-chain organopolysiloxane represented by the formula (1) and containing 20 to 30 silicon atoms per molecule at a weight ratio of the copolymer [II] to the copolymer [I] of 0.3 to 0.6, has excellent properties.

Generally, a copolymer comprising an organopolysiloxane having a molecular weight of 3000 to 7000 and an alkenyl-containing epoxy resin is poorly compatible with an epoxy resin matrix to cause phase separation, and an epoxy resin composition containing such a copolymer has a problem in that the surface of a molded article thereof is poor in printability. Now, the inventors have found that the printability can be improved by introducing pendant phenyl groups into the organopolysiloxane molecule constituting the copolymer; that a copolymer mixture comprising a long-chain organopolysiloxane copolymer [I] and a short-chain organopolysiloxane copolymer [II] at a specific ratio is homogeneously dispersible in a curable epoxy resin, so that a composition comprising an epoxy resin and a copolymer mixture as described above does not cause lowering in the glass transition point and exhibits a low expansion coefficient; that the above copolymer mixture contains an epoxy resin segment which is the same as or similar to that of a curable epoxy resin, so that the mixture is highly compatible with a curable epoxy resin to permit the micro-dispersion of the mixture in the resin, thus dramatically enhancing the crack resistance; and that accordingly an epoxy resin composition containing a copolymer mixture as described above causes reduced deformation of an aluminum electrode under stress in the heat cycle test. The present invention has been accomplished on the basis of these findings.

Namely, the present invention provides an epoxy resin composition comprising an epoxy resin, a curing agent, and the organopolysiloxane copolymer mixture which attains the object of the present invention.

DETAILED DESCRIPTION OF THE PREFERRED EMBODIMENTS

The epoxy resin constituting the composition of the present invention is not particularly limited in molecular structure or molecular weight, but any conventional one having at least two epoxy groups per molecule may be used as far as it can be cured with a curing agent as will be described below, and examples thereof include epoxy resins prepared from epichlorohydrin and various novolac resins such as bisphenol A, bisphenol F, bisphenol AF, phenol novolac resin or cresol novolac resin, alicyclic epoxy resins, epoxy resins containing a halogen atom such as a chlorine or bromine atom, and epoxidized triphenolmethane or its condensation polymer product.

These epoxy resins may be used alone or as a mixture of two or more of them.

The above epoxy resins may be each used together with a suitable monoepoxy compound and examples thereof include styrene oxide, cyclohexene oxide, propylene oxide, methyl glycidyl ether, ethyl glycidyl ether, phenyl glycidyl ether, allyl glycidyl ether, octylene oxide and dodecene oxide.

Examples of the curing agent include amine compounds such as diaminodiphenylmethane, diaminodiphenyl sulfone and m-phenylenediamine; acid anhydride compounds such as phthalic anhydride, pyromellitic anhydride and benzophenonetetracarboxylic anhydride: and phenyl novolac resins containing at least two hydroxyl groups per molecule such as phenol novolac and cresol novolac resins. The amount of the curing agent relative to the amount of the epoxy resin in the curable epoxy resin composition is not particularly limitative provided that complete curing of the epoxy resin can be attained.

The copolymer mixture constituting the composition of the present invention comprises a long-chain organopolysiloxane copolymer [I] prepared by the addition reaction of alkenyl groups of an alkenyl-containing epoxy resin with ≡Si—H groups of a long-chain organopolysiloxane represented by the formula (1):

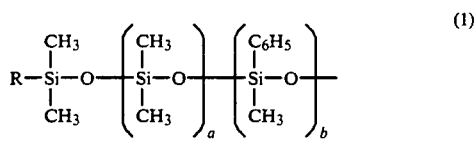
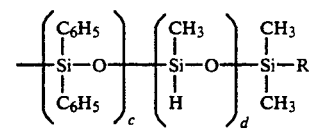

(wherein R is a hydrogen atom or a methyl group, a, b, c, and d are integers satisfying the relationships: $a \geq 1$, $b \geq 0$, $c \geq 0$, $d \geq 0$, and $b+c \geq 1$, the amount of the phenyl group is 4 to 15 mole % based on the total amount of the methyl and phenyl groups, and the number of hydrogen atoms directly bonded to silicon atoms per molecule at least 2) and containing 70 to 300 silicon atoms per molecule, and a short-chain organopolysiloxane copolymer [II] prepared by the addition reaction of alkenyl groups of an alkenyl-containing epoxy resin with ≡Si—H groups of a short-chain organopolysiloxane represented by the formula (1) and containing 20 to 30 silicon atoms per molecule at a weight ratio of the copolymer [II] to the copolymer [I] of 0.3 to 0.6.

The alkenyl-containing epoxy resin to be reacted with the organopolysiloxane includes compounds having at least one lower alkenyl group such as vinyl group, allyl group, and etc. which are represented by the following formulas (2) to (5):

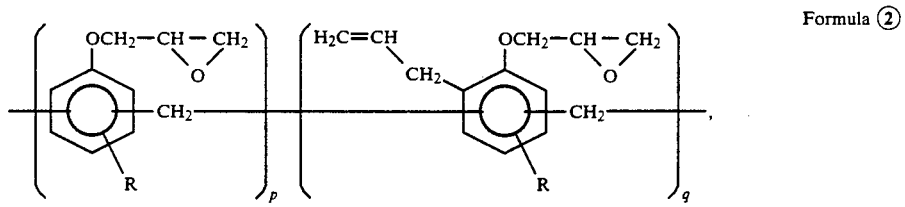

Formula (2)

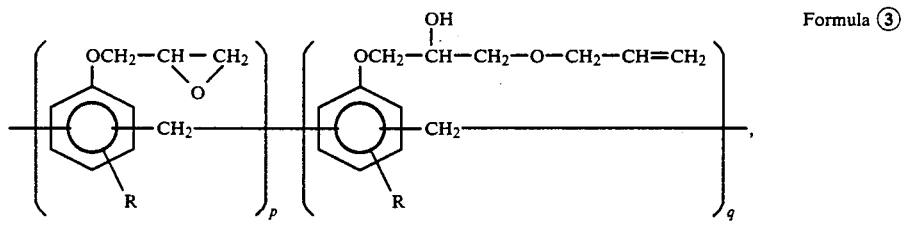

Formula (3)

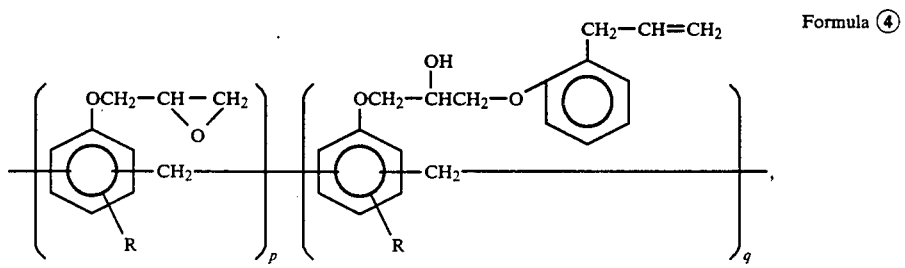

Formula (4)

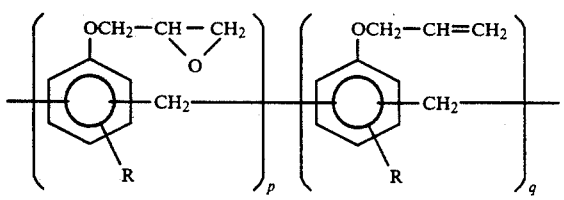

(In the formulas ②　to ⑤, each R is hydrogen atom or methyl group, p is an integer of 1 to 20 and q is an integer of 1 to 10.)

The alkenyl-containing epoxy resin to be copolymerized with a long-chain organopolysiloxane may be the same as or different from that to be copolymerized with a short-chain organopolysiloxane.

These alkenyl-containing epoxy resins can be easily prepared by a conventional process, for example, a process of epoxidizing an alkenyl-containing phenol resin with epichlorohydrin or a process of partially reacting a conventional epoxy resin with 2-allylphenol or the like.

On the other hand, the organopolysiloxane represented by the formula (1) must contain at least two hydrogen atoms directly bonded to silicon atoms per molecule, and it is particularly preferable that the organopolysiloxane have ≡Si—H groups at both terminals and examples of such organopolysiloxane include those represented by the following formulas ⑥ to ⑩

[long-chain organopolysiloxane]

Formula ⑥

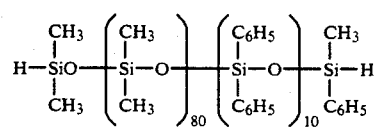

Formula ⑦

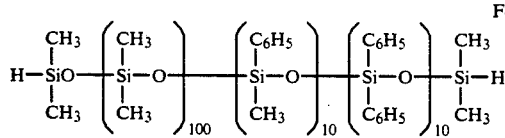

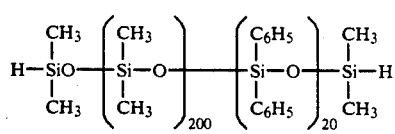

Formula ⑧

[short-chain organopolysiloxane]

Formula ⑨

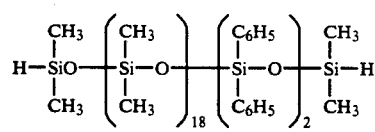

Formula ⑩

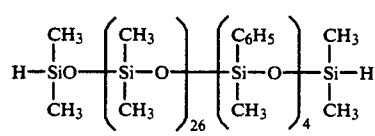

The long-chain organopolysiloxane must be one containing 70 to 300, preferably 100 to 150 silicon atoms (hereinafter referred to as the "degree of polymerization") per molecule. If the degree of polymerization is less than 70, the resulting composition will be poor in flexibility and cannot exhibit a high glass transition point, while if it exceeds 300, it will be very difficult to prepare a copolymer comprising such an organopolysiloxane and an alkenyl-containing epoxy resin. On the other hand, the short-chain organopolysiloxane must be one having a degree of polymerization of 20 to 30, preferably 23 to 26. If the degree of polymerization deviates from this range, the resulting composition will be poor in crack resistance. Generally, among the epoxy resin compositions having the same silicone atom content, those having a higher degree of polymerization favorably have a higher glass transition point but tend to undergo reduction in the crack resistance and the adhesion to an element. Such tendency can be effectively inhibited by using an organopolysiloxane comprising a mixture of the above described long-chain organopolysiloxane copolymer with the above described short-chain organopolysiloxane copolymer at a specific ratio.

The copolymer mixture to be used in the present invention comprises a mixture of two copolymers prepared by the addition reaction of alkenyl groups of an alkenyl-containing epoxy resin with ≡Si—H groups of the long-chain or short-chain organopolysiloxane represented by the formula (1). When such a copolymer mixture is added to an epoxy resin, the mixture is not compatible with the epoxy resin matrix and forms a micro-dispersion so called a sea-island structure, so that the obtained epoxy resin composition is improved in crack resistance and deformation resistance in molding.

The above copolymer mixture must have a weight ratio of the copolymer [II] to the copolymer [I] of 0.3 to 0.6, preferably 0.4 to 0.5. If the weight ratio is less than 0.3, the resulting copolymer mixture will be poorly dispersible in an epoxy resin matrix to give an epoxy resin composition poor in heat resistance and crack resistance, while if it exceeds 0.6, the resulting copolymer mixture will be easily soluble in the matrix to give an epoxy resin composition having a lowered glass transition point and poor crack resistance.

Generally, the surface of a molded article made of a composition comprising an epoxy resin and an organopolysiloxane copolymer exhibits poor printability. Since this poor printability is due to the methyl group of the organopolysiloxane, the printability can be improved by replacing the methyl group by a phenyl group.

According to the present invention, the amount of the phenyl group should be 4 to 15 mole % based on the total amount of the phenyl and methyl groups. If the amount of the phenyl group is less than 4 mole %, the printability will be insufficient, while if it exceeds 15 mole %, the resulting organopolysiloxane copolymer will be too soluble in the resin matrix to form a favorable sea-island structure, so that the obtained epoxy resin composition will be poor in crack resistance, though the printability is improved. It is preferred that the phenyl content of the organopolysiloxane be 10 to 15 mole %.

The copolymers according to the present invention can be prepared by the addition reaction lower alkenyl groups such as vinyl, allyl of an alkenyl-containing epoxy resin with ≡Si—H groups of a long-chain or short-chain organopolysiloxane as described above at an ordinary or elevated temperature. It is preferable to use a solvent in this reaction to thereby mix both the components with each other homogeneously or nearly homogeneously. Examples of the solvent include methyl isobutyl ketone, toluene, dioxane and methyl Cellosolve. Further, it is preferable to use water, an alcohol such as butanol, isopropyl alcohol or ethanol or a phenol to accelerate the addition. Furthermore, it is preferable to use conventional platinum group metals catalysts for an addition reaction. These catalysts include a platinum catalyst, a palladium catalyst and a rhodium catalyst, and the platinum catalyst is most preferable. The platinum catalyst includes platinum black, catalysts consisting of various carriers such as alumina and silica on which solid platinum is placed, chloroplatinic acid, alcohol-modified chloroplatinic acid, complexes of chloroplatinic acid and olefines, complexes of platinum and vinylsiloxanes. The catalysts is preferably used in an amount from 0.5 to 500 ppm (calculated as platinum group metals), and more preferably from 2 to 200 ppm per the alkenyl-containing epoxy resin.

It is preferable for obtaining an epoxy resin composition excellent in crack resistance and adhesion to an element that the above copolymers be insoluble in the epoxy resin matrix and form a fine sea-island structure. Therefore, it is necessary that the long-chain or short-chain organopolysiloxane represented by the formula (1) be reacted with an alkenyl-containing epoxy resin in such a manner as to satisfy the relationship: $1.0 > (X)/(Y) > 25$, wherein (X) is the functional equivalent (i.e. ≡Si—H equivalent) of the organopolysiloxane and (Y) is the molecular weight of the alkenyl-containing epoxy resin.

If the amount of the organopolysiloxane copolymer mixture to be added is less than 1 part by weight per 100 parts by weight of the epoxy resin and the curing agent, the obtained composition will have an insufficient effect of enhancing the glass transition point, improving the crack resistance or inhibiting the migration of aluminum wiring. On the contrary, if the amount exceeds 100 parts by weight, the obtained epoxy resin composition may tend to exhibit lowered mechanical strengths. Accordingly, it is preferable that the amount be 1 to 100 parts by weight, still preferably 2 to 60 parts by weight.

If necessary, the epoxy resin composition of the present invention may further contain an inorganic filler. The amount of the inorganic filler to be added may be in an ordinary range and the kind of the inorganic filler to be added and the mode of its use. i.e., whether only one filler is used or two or more fillers are simultaneously used, may be suitably selected depending upon the applications of the epoxy resin composition. For example, one or more members selected from among natural silicas such as crystalline silica and amorphous silica; synthetic high-purity silicas, synthetic spherical silica such as fumed silica, precipitated silica, talc, mica, silicon nitride, boron nitride alumina, and aluminum may be used.

The composition of the present invention may further contain various additives depending upon the object or application thereof. To further promote the curing reaction by the curing agent, curing promotors are preferably used in the composition of the present invention. The curing promotors include amines such as tributylamine, 1,8-diazobicycloundecene-7, organic phosphines such as triphenylphosphine, imidazoles such as 2-phenylimidazole. Examples of the additive include mold release agents such as waxes and fatty acids (e.g., stearic acid) and metal salts thereof; pigment such as carbon black, dyes, antioxidants, flame-retardants and surface treatments (such as γ-glycidoxypropyltrimethoxysilane).

The epoxy resin composition of the present invention can be prepared by mixing components as described above together each in a predetermined amount by stirring, kneading the obtained mixture in a kneader, roll or extruder preliminarily heated to 70° to 95° C. and cooling the kneaded mixture, followed by pulverization. The order of the addition of the components is not particularly limited.

The epoxy resin composition of the present invention is not only useful as molding material or powder coating material, but also effectively applicable to the sealing of semiconductor devices such as IC, LSI, transistor, thyristor or diode or the preparation of printed circuit boards.

The sealing of a semiconductor device with the epoxy resin composition of the present invention can be carried out by a conventional molding process such as transfer, injection, potting or casting. In conducting the sealing, it is preferable that the composition be molded at 150° to 180° C. and post-cured at 150° to 180° C. for 2 to 16 hours.

The preparation of the copolymer to be used in the present invention will now be described by referring to the following Synthesis Examples.

SYNTHESIS EXAMPLES

A cresol novolac resin and allyl glycidyl ether were fed into a 1-l four-necked flask fitted with a reflux condenser, a thermometer, a stirrer and a dropping funnel to carry out a reaction. Then, epichlorohydrin was added to the reaction mixture to carry out epoxidation according to a conventional process. Thus, an alkenyl-containing cresol novolac epoxy resin (allyl equivalent: 1500, epoxy equivalent: 270, hydrolyzable chlorine content: 700 ppm) was obtained.

120 g of the alkenyl-containing cresol novolac epoxy resin prepared above, 100 g of methyl isobutyl ketone, 200 g of toluene and 0.04 g of a 2% (in terms of platinum) solution of chloroplatinic acid in 2-ethylhexanol were put in the same four-necked flask as that used above to carry out azeotropic dehydration for one hour. 50 g of one or more phenyl-containing organopolysiloxane listed in Table 1 was dropped into the flask at a reflux temperature for a period of 30 minutes. The resulting mixture was further stirred at that temperature for 4 hours to carry out a reaction. The reaction mixture was washed with water and distilled under a reduced pressure to remove the solvent. Thus, reaction products I and II listed in Table 1 were obtained.

Copolymer mixtures A to J and those 0 to T were obtained by mixing reaction products I and II at a specific mixing ratio stated in Table 1. In contrast, Copolymer U was prepared by mixing 70% of a long-chain organopolysiloxane listed in Table 1 with 30% of a short-chain one listed therein to form an organopolysiloxane mixture and reacting the mixture with an alkenyl-containing epoxy resin according to the same process as described in the above.

limited by them. In the Examples and Comparative Examples all "parts" are "parts by weight".

TABLE 1

Phenyl-containing organopolysiloxane $$H-Si\begin{pmatrix}CH_3\\|\\CH_3\end{pmatrix}\begin{pmatrix}CH_3\\|\\Si-O\\|\\CH_3\end{pmatrix}_a\begin{pmatrix}C_6H_5\\|\\Si-O\\|\\CH_3\end{pmatrix}_b\begin{pmatrix}C_6H_5\\|\\Si-O\\|\\C_6H_5\end{pmatrix}_c\begin{pmatrix}CH_3\\|\\Si-H\\|\\CH_3\end{pmatrix}$$

[wherein a, b and c are as specified below]

| Copolymer mixture | Organopolysiloxane | a | b | c | Appearance | Viscosity (cp at 150° C.) | Phenyl*2 content (mole %) | Ratio of [II] to [I] |
|---|---|---|---|---|---|---|---|---|
| A | I*1 | 100 | 20 | 0 | milky solid | 850 | 8.2 | 0.43 |
|   | II*1 | 27 | 3 | 0 | pale yellow transparent solid | 510 | 4.7 | |
| B | I | 70 | 14 | 0 | milky solid | 720 | 8.1 | 0.43 |
|   | II | 27 | 3 | 0 | pale yellow transparent solid | 510 | 4.7 | |
| C | I | 24 | 48 | 0 | milky solid | 880 | 8.3 | 0.43 |
|   | II | 27 | 3 | 0 | pale yellow transparent solid | 510 | 4.7 | |
| D | I | 100 | 20 | 0 | milky solid | 870 | 8.2 | 0.43 |
|   | II | 18 | 2 | 0 | pale yellow transparent solid | 420 | 4.5 | |
| E | I | 100 | 12 | 0 | milky solid | 820 | 5.3 | 0.43 |
|   | II | 27 | 3 | 0 | pale yellow transparent solid | 510 | 4.7 | |
| F | I | 100 | 40 | 0 | milky solid | 880 | 14.1 | 0.43 |
|   | II | 21 | 9 | 0 | pale yellow transparent solid | 530 | 14.1 | |
| G | I | 100 | 0 | 15 | milky solid | 820 | 12.8 | 0.43 |
|   | II | 27 | 3 | 0 | pale yellow transparent solid | 510 | 4.7 | |
| H | I | 100 | 10 | 10 | milky solid | 840 | 12.3 | 0.43 |
|   | II | 27 | 3 | 0 | pale yellow transparent solid | 510 | 4.7 | |
| I | I | 100 | 20 | 0 | milky solid | 850 | 8.2 | 0.32 |
|   | II | 27 | 3 | 0 | pale yellow transparent solid | 510 | 4.7 | |
| J | I | 100 | 20 | 0 | milky solid | 850 | 8.2 | 0.59 |
|   | II | 27 | 3 | 0 | pale yellow transparent solid | 510 | 4.7 | |
| K | I | 100 | 0 | 0 | milky solid | 830 | 0 | use of one copolymer |
| L | II | 30 | 0 | 0 | pale yellow transparent solid | 480 | 0 | use of one copolymer |
| M | I | 100 | 20 | 0 | milky solid | 850 | 8.2 | use of one copolymer |
| N | II | 27 | 3 | 0 | pale yellow transparent solid | 510 | 4.7 | use of one copolymer |
| O | I | 40 | 8 | 0 | milky solid | 590 | 8.0 | 0.43 |
|   | II | 10 | 1 | 0 | pale yellow transparent solid | 220 | 3.8 | |
| P | I | 400 | 0 | 40 | milky solid | 920 | 9.0 | 0.43 |
|   | II | 50 | 5 | 0 | pale yellow transparent solid | 600 | 4.4 | |
| Q | I | 100 | 5 | 0 | milky solid | 840 | 2.3 | 0.43 |
|   | II | 29 | 1 | 0 | pale yellow transparent solid | 490 | 1.6 | |
| R | I | 100 | 0 | 40 | milky solid | 850 | 28.2 | 0.4 |
|   | II | 21 | 9 | 0 | pale yellow transparent solid | 520 | 14.1 | |
| S | I | 100 | 20 | 0 | milky solid | 850 | 8.2 | 0.1 |
|   | II | 27 | 3 | 0 | pale yellow transparent solid | 510 | 4.7 | |
| T | I | 100 | 20 | 0 | milky solid | 850 | 8.2 | 1.0 |
|   | II | 27 | 3 | 0 | pale yellow transparent solid | 510 | 4.7 | |
| U*3 |  | 100 | 20 | 0 | milky solid | 840 | 8.2 | (0.43)*3 |
|   |  | 27 | 3 | 0 |  |  | 4.7 | |

*1I: long-chain organoplysiloxane copolymer
II: short-chain organoplysiloxane copolymer
*2Phenyl content: mole % of the phenyl group based on the total amount of the methyl and phenyl groups
*3Copolymer U: prepared by mixing 70% of a long-chain organopolysiloxane listed in Table 1 with 30% of a short-chain one listed therein to form an organopolysiloxane mixture and reacting the mixture with an alkenyl-containing epoxy resin according to the process described in the foregoing Synthesis Examples.

The present invention will now be described in more detail by referring to the following Examples and Comparative Examples, though the present invention is not

EXAMPLES AND COMPARATIVE EXAMPLES 54 parts of an epoxidized cresol novolac resin having an epoxy equivalent of 200, 35 parts of a phenol novolac resin having a phenol equivalent of 110 and 16 parts of the copolymer prepared in the foregoing Synthesis Examples and listed in Table 1 were mixed together, followed by the addition of 10 parts of a brominated epoxy novolac resin, 1.5 parts of γ-glycidoxypropyl-trimethoxysilane, 1.5 parts of wax E, 1.0 parts of carbon black and 0.8 part of triphenylphosphine. The obtained mixture was homogeneously melt-kneaded with a hot twin-roll mill. Thus, twenty-one epoxy resin compositions (Examples 1 to 10 and Comparative Examples 1 to 11) were prepared.

The compositions were examined for the following items (i) to (vi):

(i) Spiral Flow Value

Determined by the use of a mold according to EMMI standards under the conditions of 175° C. and 70 kg/cm$^2$.

(ii) Mechanical Strengths

(Flexural Strength and Flexural Modulus)

Each of the compositions was molded at 175° C. under a pressure of 70 kg/cm$^2$ with a molding time of 2 minutes into a test rod (10×4×100 mm). This rod was post-cured at 180° C. for 4 hours and examined according to JIS K 6911.

(iii) Glass Transition Point and Expansion Coefficient

A test piece (4 mmφ×15 mm) made of the composition was examined with a dilatometer at a rate of temperature rise of 5° C./minute.

(iv) Crack Resistance

A silicon chip (9.4×4.5×0.5 mm) bonded to a 14-pin IC frame (42 alloy) was sealed with an epoxy resin composition under the molding conditions of 175° C. for 2 minutes. The sealed chip was post-cured at 180° C. for 4 hours and repeatedly subjected to a heat cycle of −196° C. for 1 minute and 260° C. for 30 seconds. After 200 cycles, the cracking rate of the resin was determined.

(v) Printability

Printing was made on the surface of a test piece (50 mmφ×3 mm) with Epomark (a product of Shin-Etsu Chemical Co., Ltd.), followed by postcure at 150° C. for 2 hours. The printed surface was rubbed with a gauze under a load of 100 g to determine the number of rubbing runs repeated until the disappearance of the print.

⊙: good print even after repeating the rubbing 50 times or more

Δ: good print after repeating the rubbing 20 to 50 times x: print disappeared before repeating the rubbing 20 times

(vi) Taping Property

A 20 mm wide adhesive tape was applied to a test piece (50 mmφ×3 mm) to determine the adhesion of the tape to the surface of the test piece.

TABLE 2

| | | Example No. | | | | | | | | | |
|---|---|---|---|---|---|---|---|---|---|---|---|
| | | 1 | 2 | 3 | 4 | 5 | 6 | 7 | 8 | 9 | 10 |
| Composition | copolymer used (amount: 16 parts) | A | B | C | D | E | F | G | H | I | J |
| Characteristics | spiral flow (inch) | 22 | 20 | 19 | 21 | 21 | 22 | 20 | 19 | 18 | 20 |
| | flexural strength (kg/mm$^2$) | 12.2 | 12.5 | 12.4 | 13.0 | 12.6 | 12.2 | 12.7 | 12.0 | 12.6 | 12.7 |
| | flexural modulus (kg/mm$^2$) | 1260 | 1220 | 1280 | 1250 | 1210 | 1280 | 1270 | 1300 | 1220 | 1240 |
| | expansion coefficient (×10$^{-5}$/°C.) | 1.7 | 1.7 | 1.7 | 1.7 | 1.7 | 1.7 | 1.7 | 1.7 | 1.7 | 1.7 |
| | glass transition point (°C.) | 165 | 161 | 168 | 166 | 167 | 165 | 168 | 167 | 165 | 164 |
| | crack resistance (%) | 0 | 0 | 0 | 0 | 0 | 0 | 0 | 0 | 5 | 10 |
| | printability | ⊙ | ⊙ | ⊙ | ⊙ | ⊙ | ⊙ | ⊙ | ⊙ | ⊙ | ⊙ |
| | taping property (g) | 70 | 75 | 71 | 79 | 74 | 75 | 70 | 72 | 79 | 74 |

| | | Comparative Example No. | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Composition | copolymer used (amount: 16 parts) | K | L | M | N | O | P | Q | R | S | T | U |
| Characteristics | spiral flow (inch) | 19 | 21 | 20 | 21 | 22 | 18 | 19 | 19 | 20 | 21 | 19 |
| | flexural strength (kg/mm$^2$) | 12.5 | 12.7 | 12.4 | 12.6 | 12.2 | 12.5 | 12.4 | 12.0 | 12.8 | 12.5 | 12.4 |
| | flexural modulus (kg/mm$^2$) | 1280 | 1210 | 1250 | 1240 | 1300 | 1290 | 1260 | 1210 | 1270 | 1260 | 1210 |
| | expansion coefficient (×10$^{-5}$/°C.) | 1.7 | 1.9 | 1.7 | 1.9 | 1.7 | 1.7 | 1.7 | 1.7 | 1.7 | 1.7 | 1.7 |
| | glass transition point (°C.) | 168 | 150 | 165 | 152 | 151 | 166 | 167 | 150 | 164 | 146 | 161 |
| | crack resistance (%) | 0 | 90 | 85 | 95 | 96 | 91 | 10 | 88 | 92 | 97 | 89 |
| | printability | x | x | Δ | Δ | ⊙ | ⊙ | x | ⊙ | ⊙ | ⊙ | ⊙ |
| | taping property | 10 | 15 | 65 | 68 | 72 | 70 | 22 | 79 | 71 | 69 | 72 |

What is claimed is:
1. An epoxy resin composition comprising
   a. an epoxy resin,
   b. a curing agent, and
   c. a copolymer mixture comprising
      a long chain organopolysiloxane copolymer (I) prepared by the addition reaction of an alkenyl-containing epoxy resin with a long-chain organopolysiloxane represented by the formula (1):

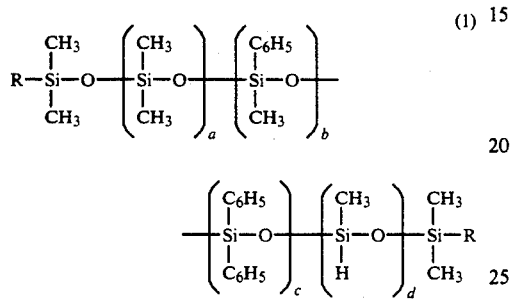

wherein R is a hydrogen atom or a methyl group, a, b, c, and d are integers satisfying the relationships: $a \geq 1$, $b \geq 0$, $c \geq 0$, $d \geq 0$, and $b+c \geq 1$, the amount of the phenyl group is 4 to 15 mole % based on the total amount of the methyl and phenyl groups, and the number of hydrogen atoms directly bonded to silicon atoms per molecule is at least 2 and containing 70 to 300 silicon atoms per molecule, and a short-chain organopolysiloxane copolymer [II] prepared by the addition reaction of an alkenyl-containing epoxy resin with a short-chain organopolysiloxane represented by the formula (1) and containing 20 to 30 silicon atoms per molecule at a weight ratio of the copolymer [II] to the copolymer [I] of 0.3 to 0.6, wherein said epoxy resin recited by a is different from said copolymer mixture recited by c.

2. The epoxy resin composition of claim 1 wherein the organopolysiloxane has $\equiv$Si—H groups at both terminals.

3. The epoxy resin composition of claim 1 wherein the amount of the phenyl group in the organopolysiloxane is 10 to 15 mole % based on the total amount of the methyl and phenyl groups.

4. The epoxy resin composition of claim 1 wherein the weight ratio of the copolymer [II] to the copolymer [I] of the copolymer mixture is 0.4 to 0.5.

5. The epoxy resin composition of claim 1 wherein the long-chain organopolysiloxane contains 100 to 150 silicon atoms per molecule.

6. The epoxy resin composition of claim 1 wherein the short-chain organopolysiloxane contains 23 to 26 silicon atoms per molecule.

7. The epoxy resin composition of claim 1 wherein the amount of the copolymer mixture is 1 to 100 parts by weight per 100 parts by weight of the epoxy resin and the curing agent.

8. The epoxy resin composition of claim 7 wherein the amount of the copolymer mixture is 2 to 60 parts by weight per 100 parts by weight of the epoxy resin and the curing agent.

9. The epoxy resin composition of claim 1 which further comprising an inorganic filler.

10. A cured resin obtained by curing the resin composition of claim 1.

* * * * *